US 9,162,711 B2

(12) United States Patent
Yasukata et al.

(10) Patent No.: US 9,162,711 B2
(45) Date of Patent: Oct. 20, 2015

(54) VEHICLE BODY SIDE SECTION STRUCTURE

(71) Applicant: HONDA MOTOR CO., LTD., Tokyo (JP)

(72) Inventors: Hitomi Yasukata, Wako (JP); Norihiko Nakamine, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/360,073

(22) PCT Filed: Oct. 11, 2012

(86) PCT No.: PCT/JP2012/076333
§ 371 (c)(1),
(2) Date: May 22, 2014

(87) PCT Pub. No.: WO2013/077103
PCT Pub. Date: May 30, 2013

(65) Prior Publication Data
US 2014/0327273 A1    Nov. 6, 2014

(30) Foreign Application Priority Data

Nov. 25, 2011   (JP) ................................. 2011-257700

(51) Int. Cl.
*B62D 25/24* (2006.01)
*B62D 27/02* (2006.01)
*B62D 25/04* (2006.01)
*B62D 25/06* (2006.01)

(52) U.S. Cl.
CPC ................ *B62D 27/02* (2013.01); *B62D 25/04* (2013.01); *B62D 25/06* (2013.01)

(58) Field of Classification Search
CPC ...... B62D 25/04; B62D 25/06; B62D 25/025; B62D 21/157; B62D 21/09; B62D 21/15; B62D 27/02; B62D 27/023; B62D 29/008; B60J 5/06
USPC ........... 296/115, 203.03, 203.01, 30, 10, 191, 296/193.05, 205, 209; 49/213, 225, 502, 49/216, 218, 223, 360
See application file for complete search history.

(56) References Cited

U.S. PATENT DOCUMENTS 6,709,045 B2 *   3/2004   Shuto et al. ................... 296/155
6,976,730 B2 *  12/2005   Mally et al. ............... 296/203.03

(Continued)

FOREIGN PATENT DOCUMENTS

JP      2005-280693    10/2005
JP      2005-319940    11/2005

OTHER PUBLICATIONS

International Search Report filed in PCT/JP2012/076333, date of mailing: Nov. 13, 2012.

*Primary Examiner* — Glenn Dayoan
*Assistant Examiner* — Sunsurraye Westbrook
(74) *Attorney, Agent, or Firm* — Rankin, Hill & Clark LLP

(57) ABSTRACT

A vehicle body side section structure provided with a bracket that is disposed on a connection section between a roof side rail and a center pillar. The bracket includes a rail side member that is joined to the roof side rail and forms a rail closed section in the gap with the roof side rail, a pillar side member that is joined to the center pillar and forms a pillar closed section in the gap with the center pillar, and a linking member that links the rail side member and the pillar side member on the forward side of a forward end wall section.

6 Claims, 10 Drawing Sheets

(56) References Cited

U.S. PATENT DOCUMENTS

| | | | |
|---|---|---|---|
| 7,152,914 B2 * | 12/2006 | Dingman et al. | 296/193.05 |
| 7,267,395 B2 * | 9/2007 | Tomozawa | 296/203.03 |
| 7,357,448 B2 * | 4/2008 | Chen et al. | 296/203.03 |
| 7,431,378 B2 * | 10/2008 | Chen et al. | 296/102 |

* cited by examiner (COMPARATIVE EXAMPLE)

(EMBODIMENT)

VEHICLE BODY SIDE SECTION STRUCTURE

TECHNICAL FIELD

The present invention relates to a vehicle body side section structure including a roof side rail extending longitudinally on and along an upper part of a lateral side section of a vehicle body, a center pillar extending downward from a longitudinally intermediate portion of the roof side rail, and a slide rail accommodation recess formed adjacent to the roof side rail and an upper part of the center pillar to accommodate therewithin a slide rail for a slide door.

BACKGROUND ART

A vehicle body side section structure is disclosed, for example, in Patent Literature 1, which includes a roof side rail disposed on an upper part of a lateral side section of a vehicle body and extending in a longitudinal direction of the vehicle body, a roof panel mounted on the roof side rail, a step part formed on the roof side rail to mount a slide rail thereon, and a pillar (center pillar) and a roof arch connected to the roof side rail.

The pillar and the roof arch are connected to the roof side rail in a vicinity of a vertical wall forming a front end section of the step part. According to the vehicle body side section structure, the pillar and the roof arch can be firmly connected to the roof side rail.

In the vehicle body side section structure disclosed in Patent Literature 1, in order to provide a wider opening for a slide door, a front end of a slide rail accommodation recess is positioned forward of a connection section to which the center pillar is joined. With this arrangement, however, since the connection section to which an upper end of the pillar is connected is located on a space of the slide rail accommodation recess, there is concern that a load from the center pillar would not be fully transmitted toward a roof. In other words, the strength and rigidity of the lateral side section of the vehicle body against a side collision would not be ensured.

PRIOR ART LITERATURE

Patent Literature

Patent Literature 1: Japanese Patent Application Laid-Open Publication No. 2005-319940

SUMMARY OF INVENTION

Technical Problems

It is therefore an object of the present invention to provide a vehicle body side section structure which is capable of securing sufficient strength and rigidity of a connection section between a roof side rail and a center pillar even when a space is defined within a slide rail accommodation recess, thereby ensuring sufficient strength and rigidity against a side collision.

Solutions to Problems

According to the invention as defined in claim 1, there is provided a vehicle body side section structure comprising: a roof side rail extending longitudinally on and along an upper part of a lateral side section of a vehicle body for supporting a lateral outer end of a roof panel; a center pillar extending downward from a longitudinally intermediate portion of the roof side rail; a slide rail accommodation recess configured to accommodate therewithin a slide rail for a slide door; and a bracket disposed on a connection section (99) between the roof side rail and the center pillar, wherein the side rail accommodation recess has a front end wall section configured to extend upward from a front end thereof, and wherein the bracket includes: a rail-side part joined to the roof side rail and forming a rail closed section together with the roof side rail; a pillar-side part joined to the center pillar and forming a pillar closed section together with the center pillar; and a linking part connecting the rail-side part and the pillar-side part on a forward side of the front end wall section.

Preferably, as defined in claim 2, the center pillar has a hat-shape cross section and includes a pillar side wall located inward in a vehicle width direction, front and rear walls extending respectively from front and rear ends of the pillar side wall outwardly in the vehicle width direction, a front flange extending forward from an outer end of the front wall, and a rear flange extending rearward from an outer end of the rear wall, wherein the pillar-side part of the bracket is joined to the front flange and the rear flange so as to close an opening of the center pillar of the hat-shaped cross section opened outward in the vehicle width direction, thereby forming the pillar closed section.

Preferably, as defined in claim 3, the bracket includes a bracket side wall, wherein the pillar-side part of the bracket has an inside joining part extending from a front or rear end of the bracket side wall toward a center of the width direction of the vehicle body and joined to the front or rear wall of the center pillar within the hat-shaped cross section.

Preferably, as defined in claim 4, the linking part of the bracket has a through-hole formed therein to allow a spot welding gun to access therethrough to the inside joining part.

Preferably, as defined in claim 5, the linking part of the bracket includes upper and lower flanges extending respectively from the rear end and front end of the bracket side wall toward the center of the width direction of the vehicle body, and has a U-shaped cross section formed by the bracket side wall and the upper and lower flanges.

Preferably, as defined in claim 6, the roof side rail includes a first flange on which the roof panel is mounted, a vertical wall extending downward from an outer end of the first flange, a bottom wall extending outward from a lower end of the vertical wall, and a second flange extending downward from an outer end of the bottom wall, wherein the rail-side part of the bracket includes a first joining part joined to the first flange, a bracket upper wall extending outward from the first joining part, the bracket side wall extending downward from an outer end of the bracket upper wall, and a second joining part extending downward from a lower end of the bracket side wall and joined to the second flange, and wherein the first joining part and the second joining part are joined to the roof side rail to thereby form the rail closed section.

Advantageous Effects of Invention

In the invention as defined in claim 1, the vehicle body side section structure comprising: the roof side rail extending longitudinally on and along the upper part of the lateral side section of the vehicle body for supporting the lateral outer end of a roof panel; the center pillar extending downward from the longitudinally intermediate portion of the roof side rail; the slide rail accommodation recess configured to accommodate therewithin the slide rail for the slide door; and the bracket disposed on the connection section between the roof side rail and the center pillar. The side rail accommodation recess has the front end wall section configured to extend upward from the front end thereof. The bracket includes: the rail-side part joined to the roof side rail and forming the rail closed section together with the roof side rail; the pillar-side part joined to the center pillar and forming the pillar closed section together with the center pillar; and the linking part connecting the rail-side part and the pillar-side part on the forward side of the front end wall section.

Thus, by providing the bracket configured to form the rail closed section and the pillar closed section and have the linking part which connects these closed sections at a position forward of the slide rail accommodation recess, even when a space defined within the slide rail accommodation recess is extended to the connection section, it is possible to ensure sufficient strength and rigidity of the connection section between the roof side rail and the center pillar while ensuring sufficient length of the space within the slide rail accommodation recess in the forward direction. As a result, sufficient strength and rigidity against a side collision can be ensured.

In the invention as defined in claim 2, the center pillar has the hat-shape cross section and includes the pillar side wall located inward in the vehicle width direction, the front and rear walls extending respectively from the front and rear ends of the pillar side wall outwardly in the vehicle width direction, the front flange extending forward from the outer end of the front wall, and the rear flange extending rearward from the outer end of the rear wall. The pillar-side part of the bracket is joined to the front flange and the rear flange so as to close the opening of the center pillar of the hat-shaped cross section opened outward in the vehicle width direction, thereby forming the pillar closed section. In other words, the pillar closed section is formed by closing the opening with the pillar-side part of the bracket, and the center pillar having the hat-shaped cross section includes ridges. As a result, it is possible to ensure sufficient strength and rigidity of the part disposed under the slide rail accommodation recess.

In the invention as defined in claim 3, the pillar-side part of the bracket has the inside joining part extending from the front or rear end of the bracket side wall toward the center of the width direction of the vehicle body and joined to the front or rear wall of the center pillar within the hat-shaped cross section. In other words, the bracket can be joined to the front and rear walls of the center pillar via the inside joining parts. As a result, it is possible to suppress the deformation of the hat-shaped cross section in the longitudinal direction of the vehicle body, thereby increasing the rigidity of the part forming the pillar closed section.

In the invention as defined in claim 4, since the linking part of the bracket has the through-hole formed therein to allow the spot welding gun to access therethrough to the inside joining parts, the inside joining parts can be spot-welded through the through-hole. As a result, the productivity of the lateral side section of the vehicle body can be improved.

In the invention as defined in claim 5, the linking part of the bracket includes the upper and lower flanges extending respectively from the rear end and front end of the bracket side wall toward the center of the width direction of the vehicle body, and has the U-shaped cross section formed by the bracket side wall and the upper and lower flanges. By thus forming the linking part to have the U-shaped cross section, the rigidity of the linking part can be increased.

In the invention as defined in claim 6, the roof side rail includes the first flange on which the roof panel is mounted, the vertical wall extending downward from the outer end of the first flange, the bottom wall extending outward from the lower end of the vertical wall, and the second flange extending downward from the outer end of the bottom wall. The rail-side part of the bracket includes the first joining part joined to the first flange, the bracket upper wall extending outward from the first joining part, the bracket side wall extending downward from the outer end of the bracket upper wall, and the second joining part extending downward from the lower end of the bracket side wall and joined to the second flange. The first joining part and the second joining part are joined to the roof side rail to thereby form the rail closed section. Further, by forming the roof side rail and the bracket to have the cross-sectional shapes as described above, the part forming the rail closed section includes a ridge. As a result, it is possible to ensure sufficient strength and rigidity of the part disposed forward of the slide rail accommodation recess.

DESCRIPTION OF EMBODIMENTS

A certain preferred embodiment of the present invention will be described in detail below with reference to the accompanying drawings.

Embodiment

Figure 1:
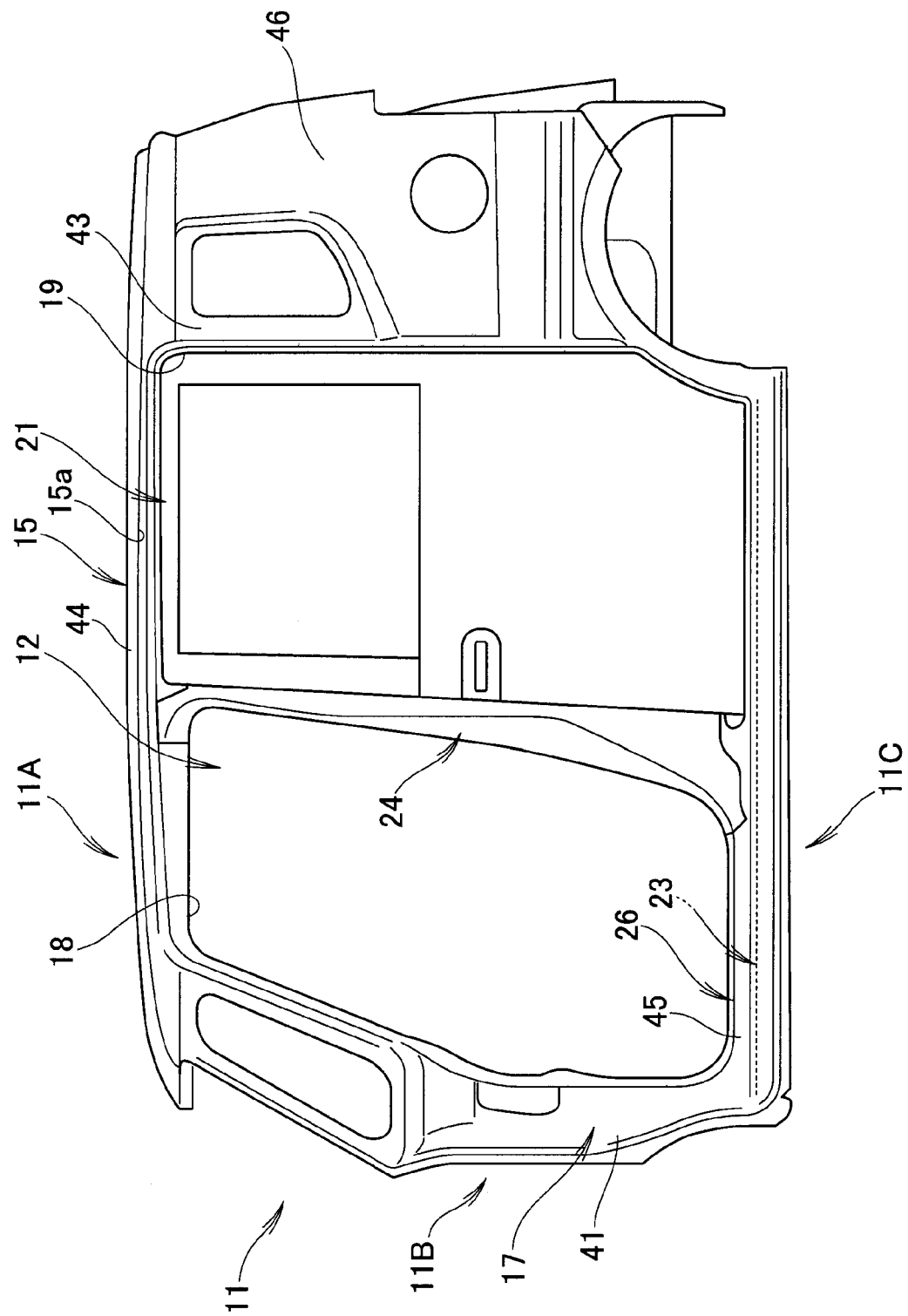
FIG. 1 is a side view of a vehicle body employing a vehicle body side section structure according to an embodiment of the present invention.
Figure 2:
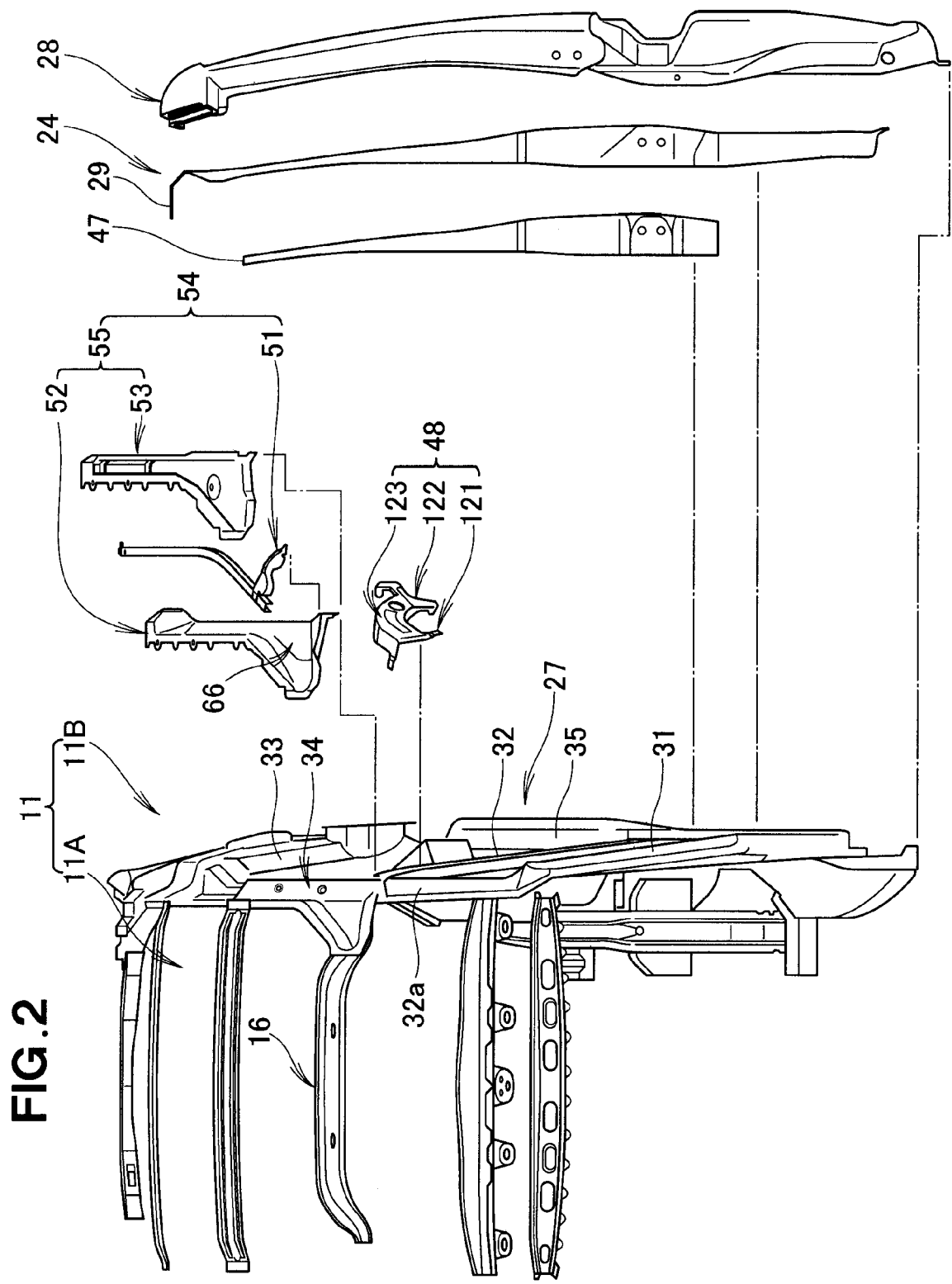
FIG. 2 is an exploded perspective view of the vehicle body side section structure of the embodiment.

As shown in FIGS. 1 and 2, a vehicle body 11 includes a roof panel 15 covering a top section 11A of the vehicle body 11, a roof arch 16 for supporting the roof panel 15, a side panel 17 covering a lateral side section 11B of the vehicle body 11, front and rear door openings 18, 19 formed in the side panel 17, a slide door 21 mounted slidably in the rear door opening 19, and a floor panel 23 covering a bottom section 11C of the vehicle body. The roof panel 15, the side panel 17, the slide door 21, and the floor panel 23 together form a vehicle compartment 12.

The side panel 17 is composed of an inner framework 27 disposed on the side of the vehicle compartment 12, a side outer panel 28 disposed on the outside of vehicle compartment 12, and a center pillar outer member 29 extending vertically across the side outer panel 28.

The inner framework 27 is composed of a front pillar inner member 31, a center pillar inner member 32, a rear pillar inner member 33, a roof side rail 34, and a side sill inner member 35.

The side outer panel 28 includes a front pillar outer member (front pillar part) 41, a rear pillar outer member (rear pillar part) 43, a roof side rail outer member (roof side rail part) 44, a side sill outer member (side sill part) 45, and a rear fender 46.

A center pillar 24 is composed of the center pillar inner member 32, the center pillar outer member 29, and a center pillar stiffener 47. An upper part of the roof side rail 34 is covered by the roof side rail part 44 of the side outer panel 28. The roof side rail 34 and the center pillar inner member 32 are connected to each other via a bracket (reinforcing bracket) 48. A side sill 26 is composed of the side sill inner member 35 and the side sill part 45 of the side outer panel 28.

A slide rail 51 for the slide door 21 is disposed on the roof side rail 34. The slide rail 51 is housed within a rail housing 55 formed by a rail housing lower member 52 and a rail housing upper member 53. The slide rail 51 and the rail housing 55 (the rail housing lower member 52 and the rail housing upper member 53) together form a rail housing component 54. The bracket 48 as a reinforcing member is disposed on the roof side rail 34 and an upper part 32a of the center pillar inner member 32.

Figure 3:
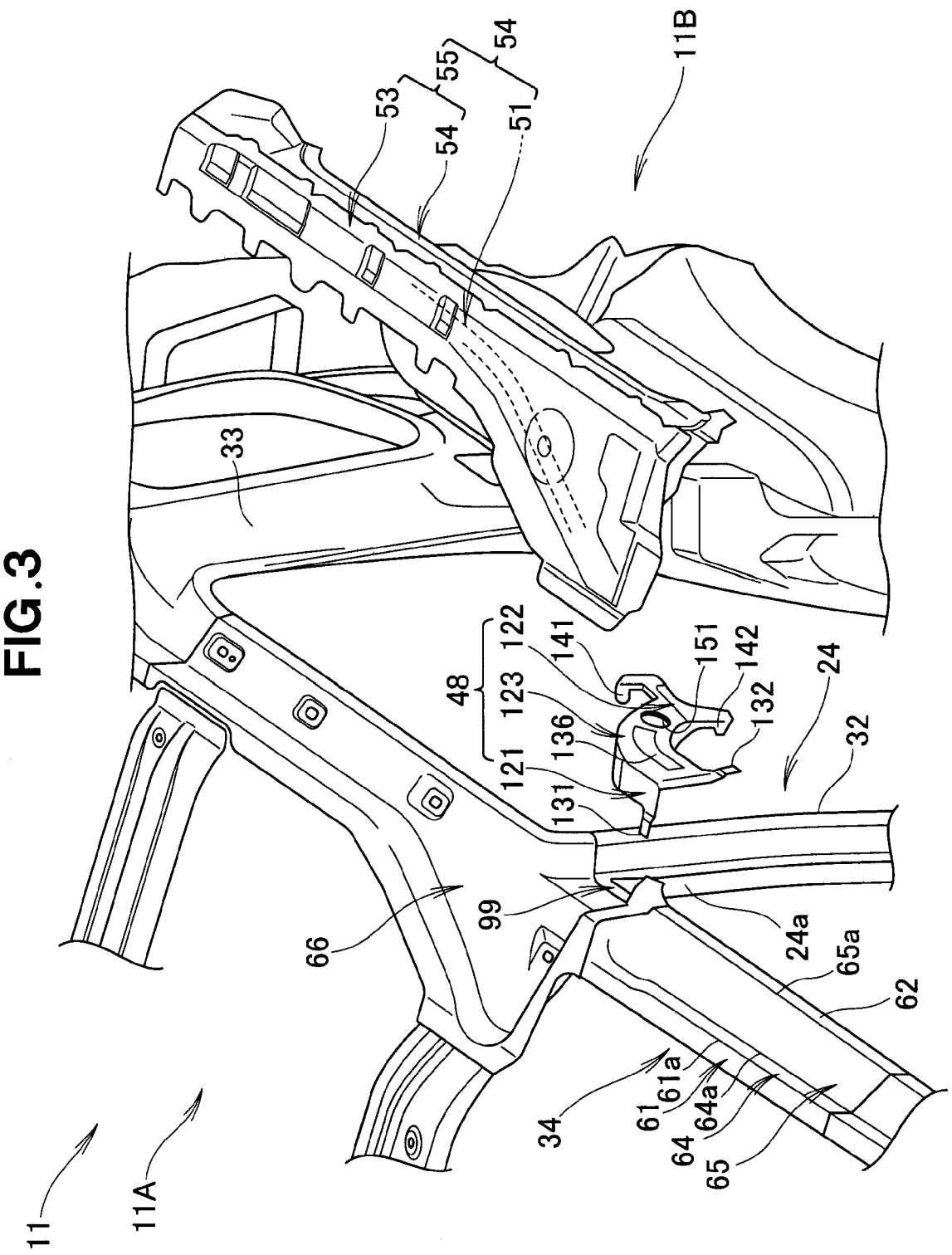
FIG. 3 is an exploded perspective view of the vehicle body side section structure of FIG. 2 as viewed from an upper left side of the vehicle body toward a rear side thereof.

As shown in FIG. 3, a vehicle body side section structure includes the roof side rail 34, the center pillar 24 extending downward from a longitudinally intermediate portion of the roof side rail 34, and a slide rail accommodation recess 66 for accommodating the slide rail 51 for the slide door 21. The roof side rail 34 is disposed on an upper side of the lateral side section 11B of the vehicle body 11 to extend in a longitudinal direction of the vehicle body 11, as shown in FIG. 1, and an outer end 15a of the roof panel 15 is mounted on the roof side rail 34.

Figure 4:
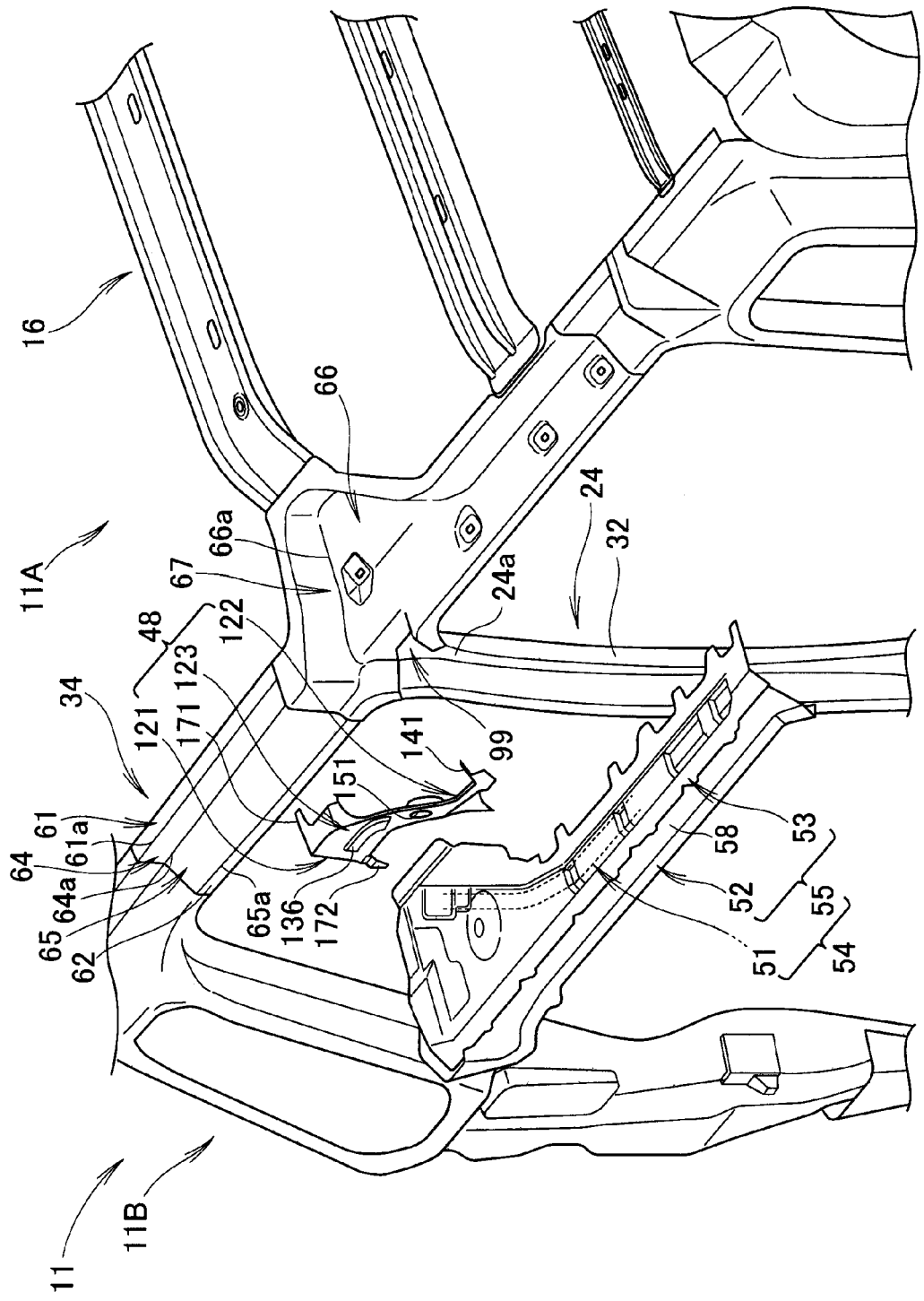
FIG. 4 is an exploded perspective view of the vehicle body side section structure of FIG. 2 as viewed from the upper left side of the vehicle body toward a front side thereof.

As shown in FIG. 4, the slide rail accommodation recess 66 has a forward end wall section or front end wall section 67 formed on a connection section 99 between the roof side rail 34 and the center pillar 24 to extend upward from a front end 66a of the slide rail accommodation recess 66.

The bracket 48 has a rail side member or rail-side part 121 joined to the roof side rail 34 and forming a rail closed section 135 (see FIG. 7) together with the roof side rail 34, a pillar side member or pillar-side part 122 joined to the center pillar 24 and forming a pillar closed section 145 (see FIG. 9) together with the center pillar 24, and a linking member or linking part 123 which connects the rail-side part 121 and the pillar-side part 122 on a forward side of the front end wall section 67, as shown in FIG. 4.

Figure 7:
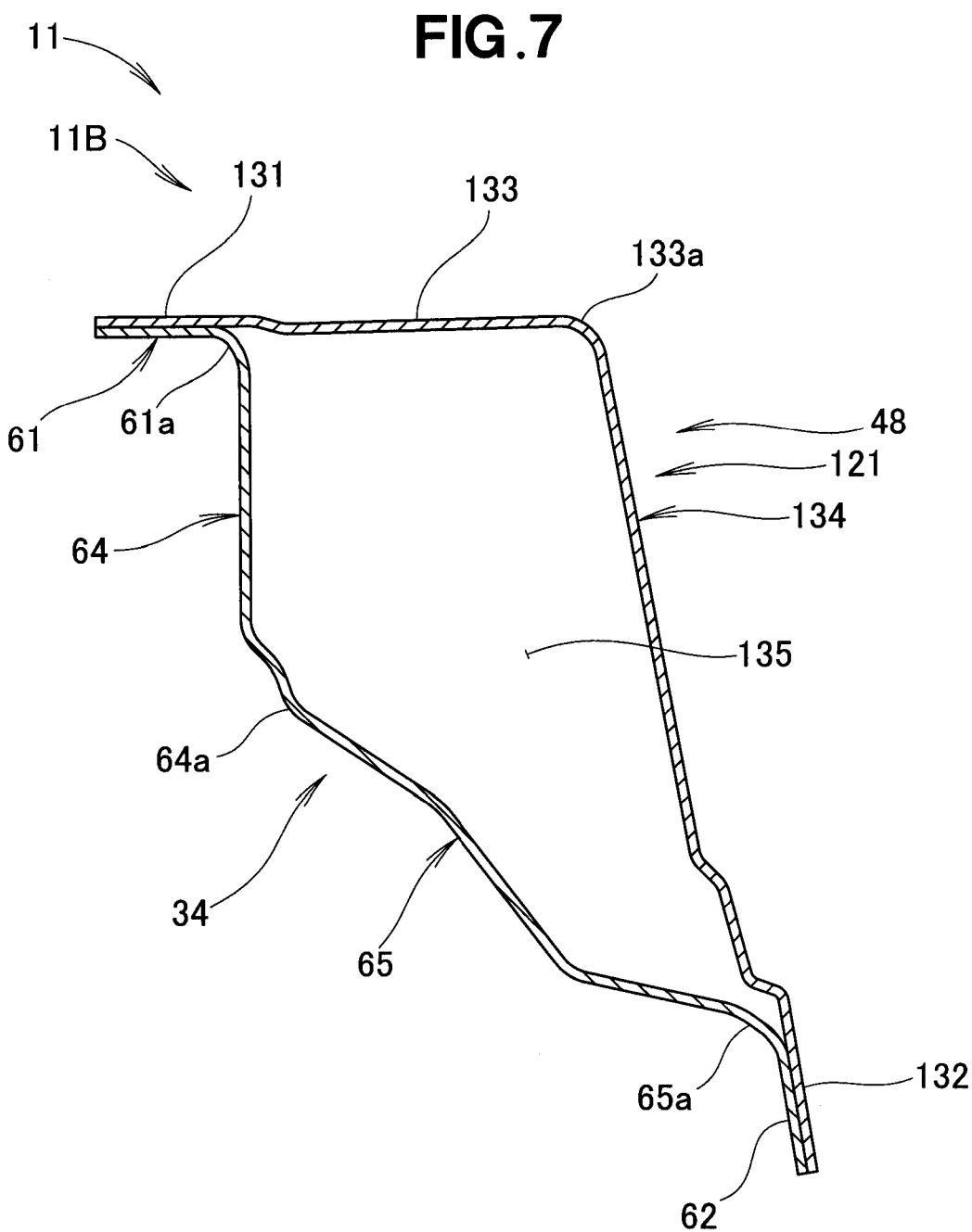
FIG. 7 is a cross-sectional view taken along line 7-7 of FIG. 6.
Figure 8:
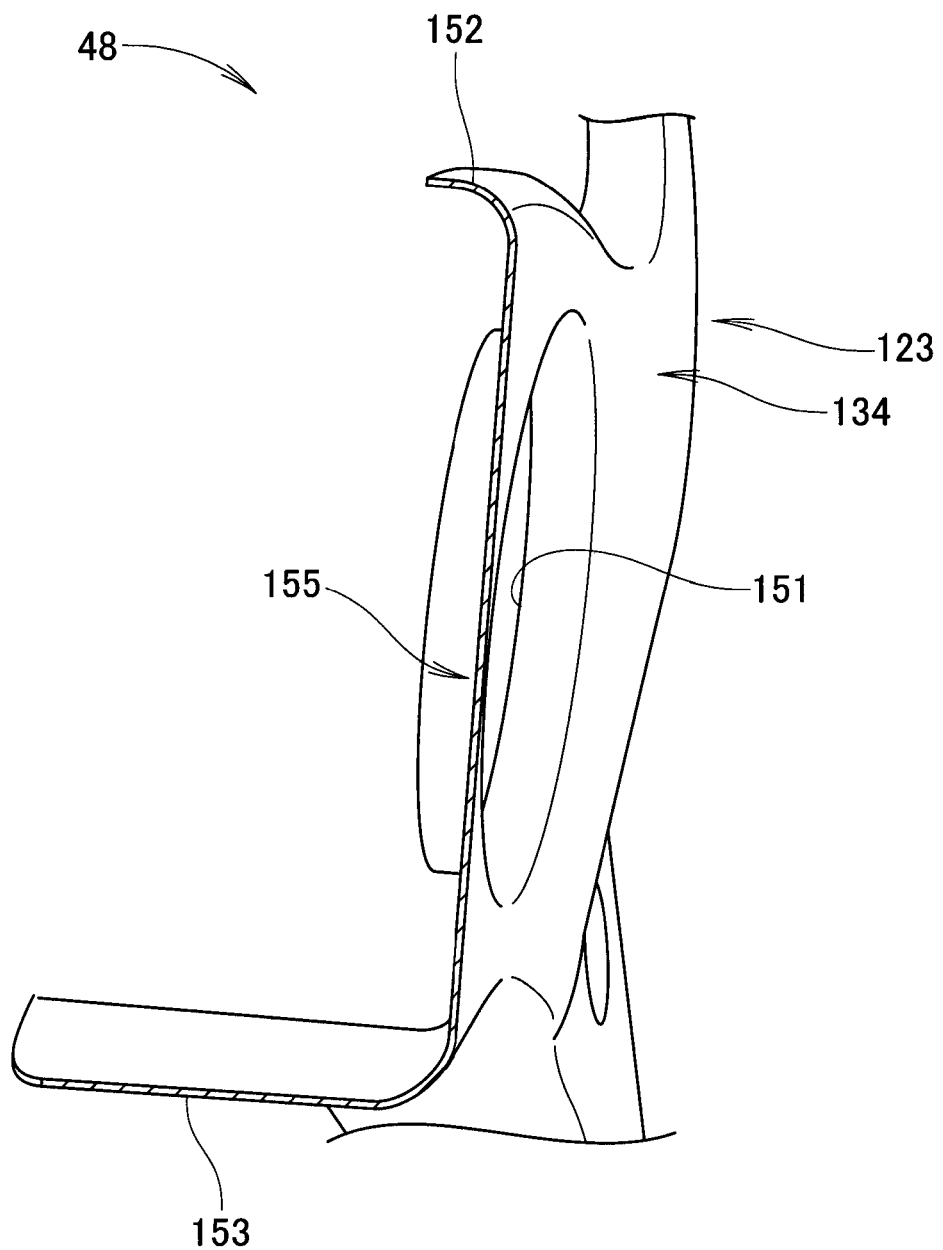
FIG. 8 is a cross-sectional view taken along line 8-8 of FIG. 6.

The bracket 48 is a reinforcing bracket mounted on the roof side rail 34 and an upper part 24a of the center pillar 24 so as to extend therebetween. That is, connection between the slide rail accommodation recess 66 for accommodating the slide rail 51 and the center pillar 24 is reinforced by the bracket 48. The rail closed section 135 shown in FIG. 7 is formed by the bracket 48 and the roof side rail 34.

Figure 5:
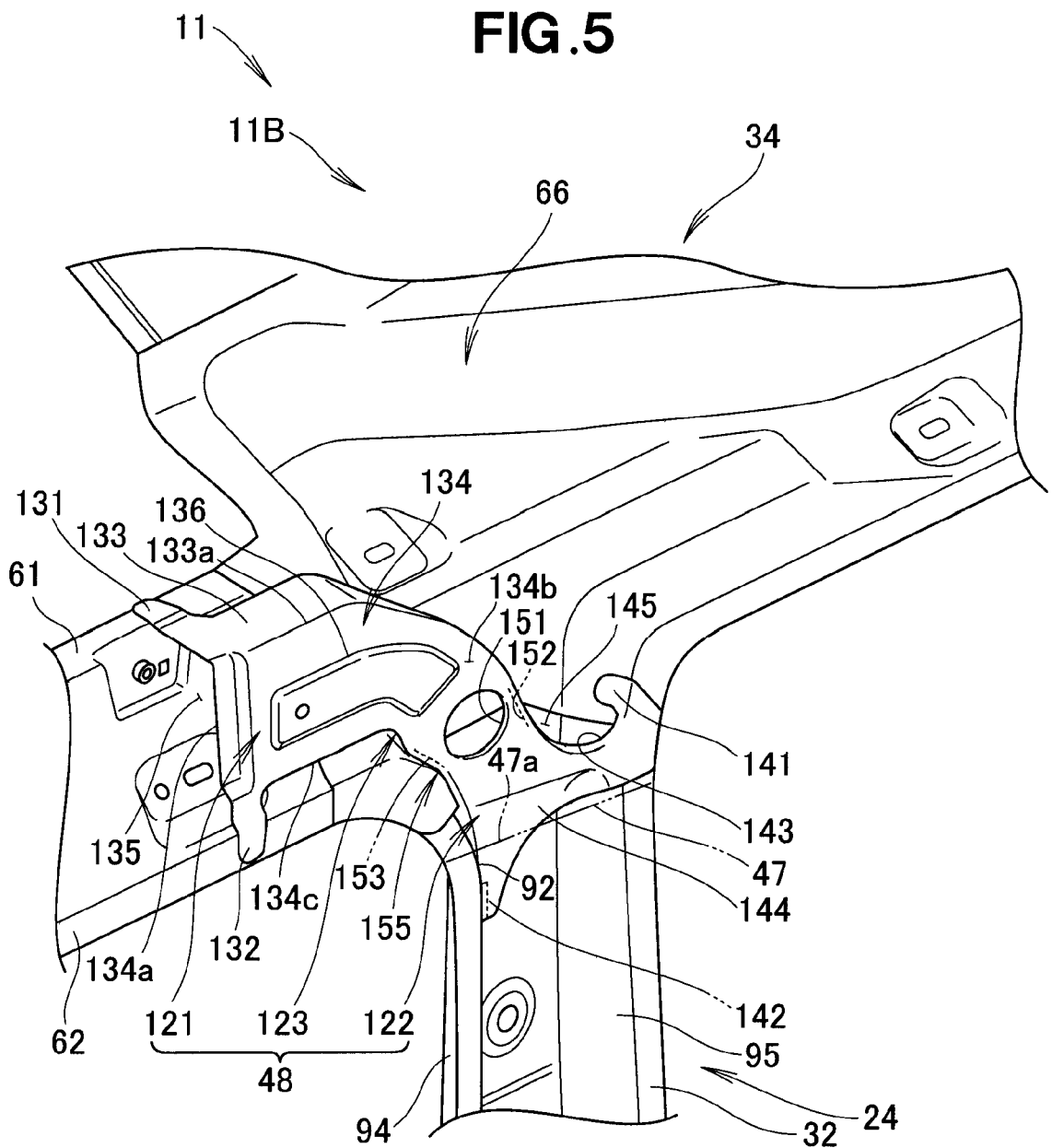
FIG. 5 is a perspective view of the vehicle body side section structure of FIG. 2 as viewed from the upper left side of the vehicle body.
Figure 6:
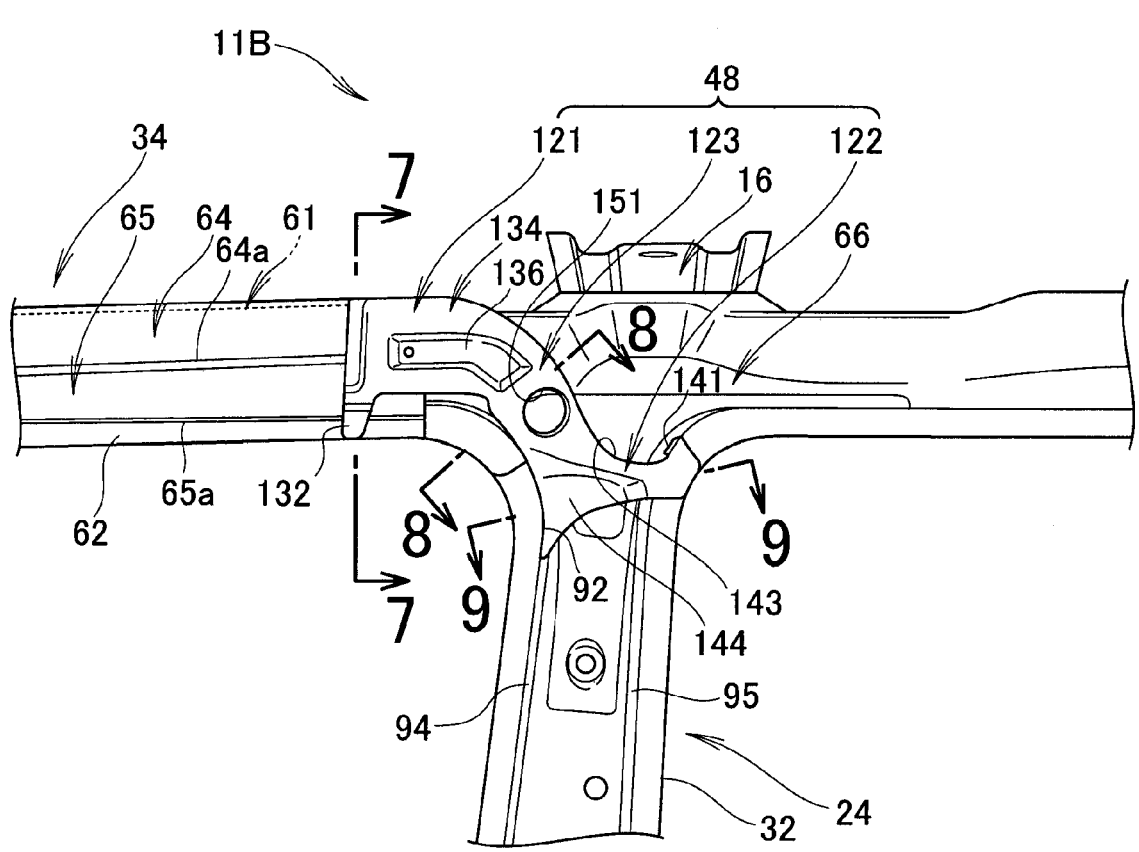
FIG. 6 is a side view of the vehicle body side section structure of FIG. 5.

As shown in FIG. 5, the rail-side part 121 of the bracket 48 includes a first joining part 131 joined to a first flange 61 of the roof side rail 34, a upper wall 133 extending outward in a vehicle width direction from the first joining part 131, a bracket side wall 134 extending downward from an outer end 133a of the upper wall 133, and a second joining part 132 extending downward from a lower end 134c of the bracket side wall 134 for joining with a second flange 62 of the roof side rail 34. The first joining part 131 and the second joining part 132 are joined to the roof side rail 34, thereby forming the rail closed section 135.

The rail-side part 121 (bracket side wall 134) of the bracket 48 has a bead 136 formed thereon so as to bulge outward, whereby the rigidity of the rail-side part 121 is increased. A cross-sectional shape of the bead 136 is gradually expanded in width (outwardly in the vehicle width direction) from the rail-side part 121 toward the pillar-side part 122. The first joining part 131 is formed to be joined to the first flange 61 of the roof side rail 34, and the second joining part 132 is formed to be joined to the second flange 62 of the roof side rail 34.

Figure 9:
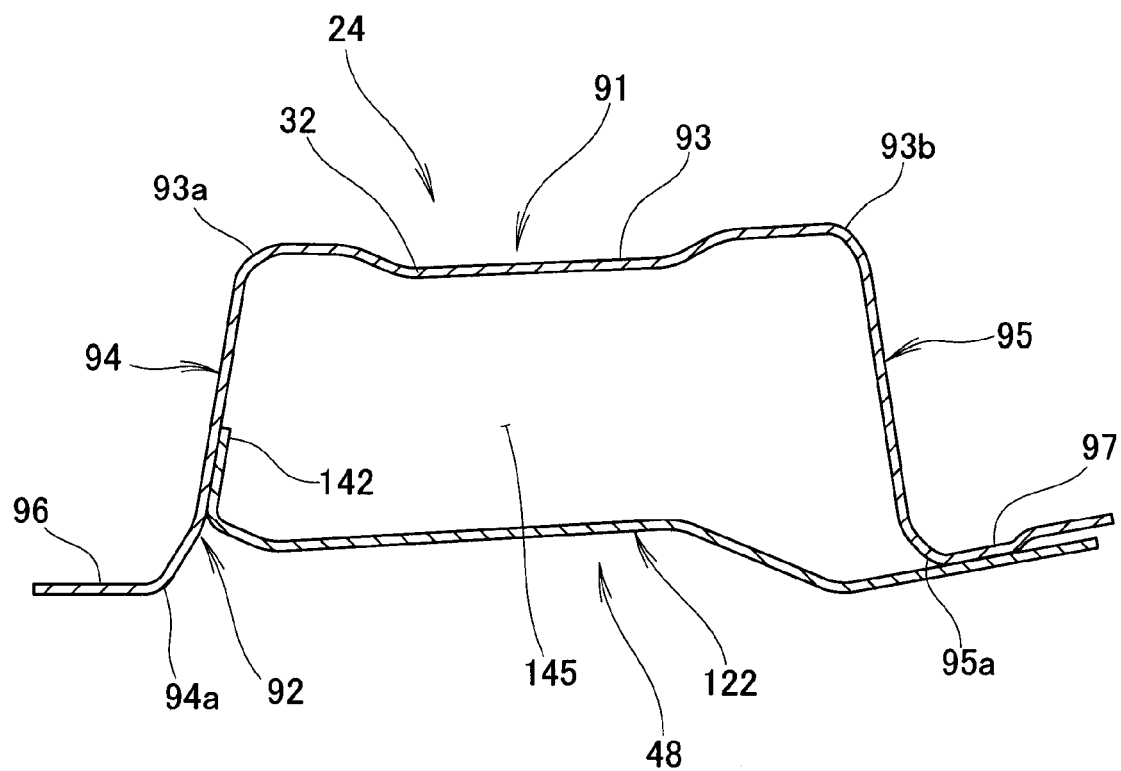
FIG. 9 is a cross-sectional view taken along line 9-9 of FIG. 6.

As shown in FIG. 9, the pillar-side part 122 of the bracket 48 is joined to front and rear flanges 96, 97 of the center pillar 24 so as to close an opening 92 of the center pillar 24 having a hat-shaped cross section 91 opened outward in the vehicle width direction, thereby forming the pillar closed section 145.

Further, as shown in FIG. 5, the pillar-side part 122 of the bracket 48 has inside joining parts 141, 142 each extending from one of front and rear ends 134a, 134b of the bracket side wall 134 toward a center of the width direction of the vehicle body 11 and each joined to one of front and rear walls 94, 95 of the center pillar 24 within the hat-shaped cross section 91. Of the inside joining parts 141, 142, the one formed on the side of the rear wall 95 will be referred to as "first inside joining part 141", and the one formed on the side of the front wall 94 will be referred to below as "second inside joining part 142".

Furthermore, the pillar-side part 122 of the bracket 48 has a gun relief part 143 formed therein to allow a spot welding gun to be inserted into the roof side rail 34 from outside of the vehicle, and a stiffener relief part 144 formed therein to prevent the pillar-side part 122 from interfering with an upper end 47a of the center pillar stiffener 47 joined to the center pillar 24. The stiffener relief part 144 is formed by depressing a part of the pillar-side part 122 toward the vehicle compartment 12.

The linking part 123 of the bracket 48 has a through-hole 151 formed therein to allow the spot welding gun to access therethrough to the inside joining parts 141, 142. The linking part 123 of the bracket 48 includes upper and lower flanges 152, 153 extending respectively from the rear end 134b and front end 134a of the bracket side wall 134 toward the center of the width direction of the vehicle body 11, and has a U-shaped cross section 155 formed by the bracket side wall 134 and the upper and lower flanges 152, 153.

As shown in FIG. 4, the roof side rail 34 includes the first flange 61 on which the roof panel 15 is mounted, a vertical wall 64 extending downward from an outer end 61a of the first flange 61, a bottom wall 65 extending outward from a lower end 64a of the vertical wall 64, and the second flange 62 extending downward from an outer end 65a of the bottom wall 65.

As shown in FIG. 9, the center pillar 24 includes a pillar side wall 93 facing in the vehicle width direction, front and rear walls 94, 95 extending respectively from front and rear ends 93a, 93b of the pillar side wall 93 outwardly in the vehicle width direction, a front flange 96 extending forward from an outer end 94a of the front wall 94, and a rear flange 97 extending rearward from an outer end 95a of the rear wall 95. The hat-shaped cross section 91 of the center pillar 24 is formed by the pillar side wall 93, the front and rear walls 94, 95, the front flange 96, and the rear flange 97.

Figure 10A:
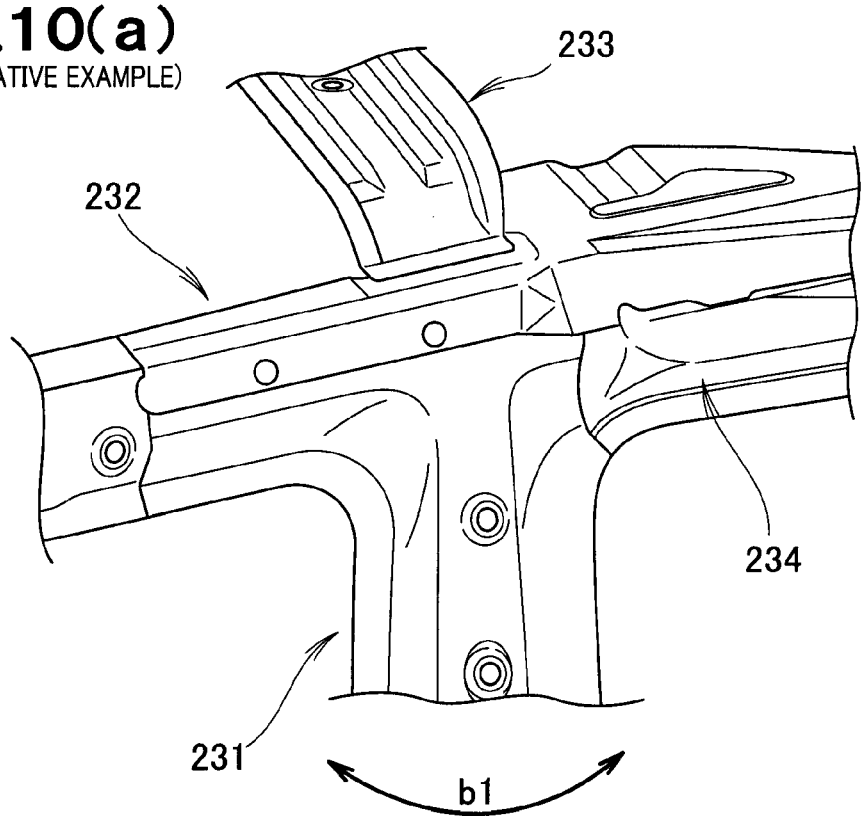
FIGS. 10(*a*) and 10(*b*) are views showing for comparative purposes the vehicle body side section structure of the embodiment and a vehicle body side section structure according to a comparative example.
Figure 10B:
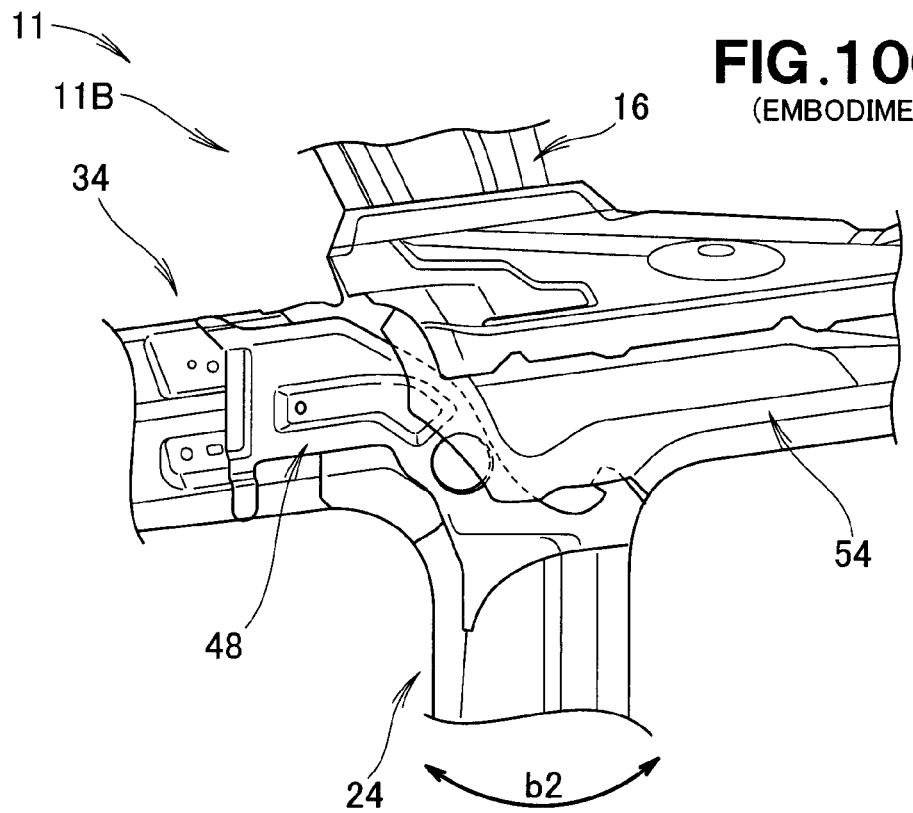

FIG. 10(a) shows of a conventional vehicle body side section structure as a comparative example, and FIG. 10(b) shows the vehicle body side section structure of the embodiment. As shown in FIG. 10(a), the vehicle body side section structure of the comparative example includes a roof side rail 232 extending in a longitudinal direction of a vehicle body, a center pillar 231 extending downward from a longitudinally intermediate portion of the roof side rail 232, a roof arch 233 extending in a vehicle width direction from the longitudinally intermediate portion of the roof side rail 232, and a rail housing component 234 disposed rearward of the center pillar 231 and the roof arch 233.

In this structure, it is necessary that the rail housing component 234 is disposed rearward of the center pillar 231 in order to ensure the rigidity of a section around the center pillar 231, the roof side rail 232, and the roof arch 233 in a direction indicated by arrow b1, and therefore a slide door (not shown) cannot have a large opening.

As shown in FIG. 10(b), in the vehicle body side section structure of the embodiment, the rail housing component 54 is extended to a position forward of the center pillar 24, and the bracket 48 is additionally provided on the connection section 99 (FIG. 4) between the roof side rail 34 and the center pillar 24 to ensure sufficient rigidity of the center pillar 24 in a direction indicated by arrow b2. As a result, the slide rail 51 for the slide door 21 can be longer, and thus the slide door 21 can have a larger opening.

As described above, the vehicle body side section structure of the embodiment includes the roof side rail 34 which extends longitudinally on and along the upper part of the lateral side section 11B of the vehicle body 11 for supporting the lateral outer end 15a of the roof panel 15, the center pillar 24 extending downward from the longitudinally intermediate portion of the roof side rail 34, the slide rail accommodation recess 66 configured to accommodate therewithin the slide rail 51 for the slide door 21, and the front end wall section 67 formed on the connection section 99 between the roof side rail 34 and the center pillar 24 to extend upward from the front end 66a of the slide rail accommodation recess 66.

The vehicle body side section structure further includes the bracket 48, which has the rail-side part 121 joined to the roof side rail 34 and forming the rail closed section 135 together with the roof side rail 34, the pillar-side part 122 joined to the center pillar 24 and forming the pillar closed section 145 together with the center pillar 24, and the linking part 123 which connects the rail-side part 121 and the pillar-side part 122 on the forward side of the front end wall section 67.

Thus, as shown in FIG. 5, by virtue of the bracket 48, which is configured to form the rail closed section 135 and the pillar closed section 145 and has the linking part 123 interconnecting these closed sections on the forward side of the slide rail accommodation recess 66, even when the slide rail accommodation recess 66 is extended to the connection section 99 (FIG. 4), it is possible to ensure sufficient strength and rigidity of the connection section 99 between the roof side rail 34 and the center pillar 24 while maintaining a sufficient length of the space within the slide rail accommodation recess 66 in the forward direction. As a result, sufficient strength and rigidity against a side collision can be ensured.

In the vehicle body side section structure, as shown in FIG. 9, the center pillar 24 includes the pillar side wall 93, the front and rear walls 94, 95 extending respectively from the front and rear ends 93a, 93b of the pillar side wall 93 outwardly in the vehicle width direction, the front flange 96 extending forward from the outer end 94a of the front wall 94, and the rear flange 97 extending rearward from the outer end 95a of the rear wall 95, together forming the hat-shaped cross section 91.

The pillar-side part 122 of the bracket 48 is joined to the front and rear flanges 96, 97 of the center pillar 24 so as to close the opening 92 of the center pillar 24 having the hat-shaped cross section 91 opened outward in the vehicle width direction, thereby forming the pillar closed section 145. In other words, the pillar closed section 145 is formed by closing the opening 92 with the pillar-side part 122 of the bracket 48, and the center pillar 24 having the hat-shaped cross section 91 includes ridges (formed on the front and rear ends 93a, 93b of the pillar side wall 93). As a result, it is possible to ensure sufficient strength and rigidity of the part disposed under the slide rail accommodation recess 66.

In the vehicle body side section structure, as shown in FIG. 5, the pillar-side part 122 of the bracket 48 has the inside joining parts 141, 142 each extending from one of the front and rear ends 134a, 134b of the bracket side wall 134 toward the center of the width direction of the vehicle body 11 and each joined to one of the front and rear walls 94, 95 of the center pillar 24 within the hat-shaped cross section 91. In other words, the bracket 48 can be joined to the front and rear walls 94, 95 of the center pillar 24 via the inside joining parts 141, 142. As a result, it is possible to suppress the deformation of the hat-shaped cross section 91 in the longitudinal direction of the vehicle body 11, thereby increasing the rigidity of the part forming the pillar closed section 145.

Since the linking part 123 of the bracket 48 has the through-hole 151 formed therein to allow the spot welding gun to access therethrough to the inside joining parts 141, 142, the inside joining parts 141, 142 can be spot welded through the through-hole 151. As a result, the productivity of the lateral side section 11B of the vehicle body 11 can be improved.

The linking part 123 of the bracket 48 includes the upper and lower flanges 152, 153 extending respectively from the rear end 134b and front end 134a of the bracket side wall 134 toward the center of the width direction of the vehicle body 11, and has the U-shaped cross section 155 formed by the bracket side wall 134 and the upper and lower flanges 152, 153. By thus forming the linking part 123 to have the U-shaped cross section 155, the rigidity of the linking part 123 can be increased.

As shown in FIG. 4, the roof side rail 34 includes the first flange 61 on which the roof panel 15 is mounted, the vertical wall 64 extending downward from the outer end 61a of the first flange 61, the bottom wall 65 extending outward from the lower end 64a of the vertical wall 64, and the second flange 62 extending downward from the outer end 65a of the bottom wall 65.

As shown in FIG. 5, the rail-side part 121 of the bracket 48 includes the first joining part 131 joined to the first flange 61 of the roof side rail 34, the upper wall 133 extending outward in the vehicle width direction from the first joining part 131, the bracket side wall 134 extending downward from the outer end 133a of the upper wall 133, and the second joining part 132 extending downward from the lower end 134c of the bracket side wall 134 for joining with the second flange 62 of the roof side rail 34.

By joining the first joining part 131 and the second joining part 132 to the roof side rail 34, the rail closed section 135 is formed. Further, by forming the roof side rail 34 and the bracket 48 to have the cross-sectional shapes as described above, the part forming the rail closed section 135 includes a ridge (formed on the outer end 133a of the upper wall 133 of the bracket 48). As a result, it is possible to ensure sufficient strength and rigidity of the part disposed forward of the slide rail accommodation recess 66.

In the preferred embodiment described above, the center pillar 24 is composed of the center pillar inner member 32, the center pillar outer member 29, and the center pillar stiffener 47, but the vehicle body side section structure of the present invention is not limited to this. For example, the center pillar may be composed without the center pillar stiffener.

INDUSTRIAL APPLICABILITY

The vehicle body side section structure of the present invention is well suited for use in passenger vehicles such as sedan cars, wagon cars, etc.

REFERENCE CHARACTERS

11B . . . side section of a vehicle body, 15 . . . roof panel, 15a . . . outer end of the roof panel, 24 . . . center pillar, 34 . . . roof side rail, 48 . . . bracket (reinforcing bracket), 51 . . . slide rail for a slide door, 61 . . . first flange, 61a . . . outer end of the first flange, 62 . . . second flange, 64 . . . vertical wall, 64a . . . lower end of the vertical wall, 65 . . . bottom wall, 65a . . . outer end of the bottom wall, 66 . . . slide rail accommodation recess, 66a . . . front end of the slide rail accommodation recess, 67 . . . front end wall section, 92 . . . opening, 93 . . . pillar side wall, 93a . . . front end of the pillar side wall, 93b . . . rear end of the pillar side wall, 94 . . . pillar front wall, 94a . . . outer end of the pillar front wall, 95 . . . pillar rear wall, 95a . . . outer end of the pillar rear wall, 96 . . . pillar front flange, 99 . . . connection section between the roof side rail and the center pillar, 121 . . . rail-side part, 122 . . . pillar-side part, 123 . . . linking part, 131 . . . first joining part, 132 . . . second joining part, 133 . . . bracket upper wall, 133a . . . outer end of the bracket upper wall, 134 . . . bracket side wall, 134a . . . front end of the bracket upper wall, 134b . . . rear end of the bracket upper wall, 134c . . . lower end of the bracket upper wall, 135 . . . rail closed section, 141, 142 . . . inside joining part (first inside joining part, second inside joining part), 145 . . . pillar closed section, 151 . . . through-hole, 152 . . . upper flange, 153 . . . lower flange, 155 . . . U-shaped cross section of the bracket

The invention claimed is:

1. A vehicle body side section structure comprising:
a roof side rail extending longitudinally on and along an upper part of a lateral side section of a vehicle body for supporting a lateral outer end of a roof panel;
a center pillar extending downward from a longitudinally intermediate portion of the roof side rail, the center pillar including a center pillar inner member disposed on an inner side in a width direction of the vehicle body and a center pillar outer member disposed on an outer side in the width direction of the vehicle body and joined to the center pillar inner member, the center pillar inner member having an upper part joined to the roof side rail;
a slide rail accommodation recess configured to accommodate therewithin a slide rail for a slide door, the slide rail accommodation recess being formed in a longitudinal portion of the roof side rail adjacent a connection section between the roof side rail and the upper part of the center pillar inner member; and
a bracket disposed on the connection section between the roof side rail and the upper part of the center pillar inner member, wherein the slide rail accommodation recess has a front end wall section configured to extend upward from a front end thereof, and
wherein the bracket includes:
a rail-side part joined to the roof side rail and forming a rail closed section together with the roof side rail;
a pillar-side part joined to the upper part of the center pillar inner member and forming a pillar closed section together with the upper part of the center pillar inner member; and
a linking part connecting the rail-side part and the pillar-side part on a forward side of the front end wall section.

2. The vehicle body side section structure of claim 1, wherein the center pillar inner member has a hat-shape cross section defining an open facing outward in the width direction of the vehicle body and includes a pillar side wall located inward in the vehicle width direction, front and rear walls extending respectively from front and rear ends of the pillar side wall outwardly in the vehicle width direction, a front flange extending forward from an outer end of the front wall, and a rear flange extending rearward from an outer end of the rear wall, and wherein the pillar-side part of the bracket is joined to the front flange and the rear flange so as to close the opening of the center pillar inner member of the hat-shaped cross section, thereby forming the pillar closed section.

3. The vehicle body side section structure of claim 2, wherein the bracket includes a bracket side wall, and wherein the pillar-side part of the bracket has an inside joining part extending from a front or rear end of the bracket side wall toward a center of the width direction of the vehicle body and joined to the front or rear wall of the center pillar inner member within the hat-shaped cross section.

4. The vehicle body side section structure of claim 3, wherein the linking part of the bracket has a through-hole formed therein to allow a spot welding gun to access therethrough to the inside joining part.

5. The vehicle body side section structure of claim 3, wherein the linking part of the bracket includes upper and lower flanges extending respectively from the rear end and front end of the bracket side wall toward the center of the width direction of the vehicle body, and has a U-shaped cross section formed by the bracket side wall and the upper and lower flanges.

6. The vehicle body side section structure of claim 1, wherein the roof side rail includes a first flange on which the roof panel is mounted, a vertical wall extending downward from an outer end of the first flange, a bottom wall extending outward from a lower end of the vertical wall in the width direction of the vehicle body, and a second flange extending downward from an outer end of the bottom wall, wherein the rail-side part of the bracket includes a first joining part joined to the first flange, a bracket upper wall extending outward from the first joining part, the bracket side wall extending downward from an outer end of the bracket upper wall, and a second joining part extending downward from a lower end of the bracket side wall and joined to the second flange, and wherein the first joining part and the second joining part are joined to the roof side rail to thereby form the rail closed section.

* * * * *